United States Patent

Yamane

(10) Patent No.: US 12,469,615 B2
(45) Date of Patent: Nov. 11, 2025

(54) IMAGING DEVICE AND IMAGE GENERATION METHOD

(71) Applicant: Kioxia Corporation, Tokyo (JP)

(72) Inventor: Takeshi Yamane, Tsukuba Ibaraki (JP)

(73) Assignee: KIOXIA CORPORATION, Tokyo (JP)

(*) Notice: Subject to any disclaimer, the term of this patent is extended or adjusted under 35 U.S.C. 154(b) by 270 days.

(21) Appl. No.: 18/456,311

(22) Filed: Aug. 25, 2023

(65) Prior Publication Data

US 2024/0096515 A1 Mar. 21, 2024

(30) Foreign Application Priority Data

Sep. 20, 2022 (JP) .................................. 2022-149238

(51) Int. Cl.
| | | |
|---|---|---|
| *G21K 7/00* | (2006.01) | |
| *G01N 23/083* | (2018.01) | |
| *G02B 21/06* | (2006.01) | |
| *G02B 21/26* | (2006.01) | |
| *G02B 21/36* | (2006.01) | |

(52) U.S. Cl.
CPC ............. *G21K 7/00* (2013.01); *G01N 23/083* (2013.01); *G02B 21/06* (2013.01); *G02B 21/26* (2013.01); *G02B 21/362* (2013.01); *G02B 21/367* (2013.01)

(58) Field of Classification Search
CPC ...... G21K 7/00; G01N 23/083; G02B 21/362; G02B 21/367; G02B 21/365
See application file for complete search history.

(56) References Cited

U.S. PATENT DOCUMENTS

| | | | |
|---|---|---|---|
| 11,402,520 B2 | 8/2022 | Yamane | |
| 2004/0019433 A1* | 1/2004 | Carpaij | G06T 7/0012 382/128 |
| 2018/0261352 A1 | 9/2018 | Matsuyama et al. | |
| 2020/0033488 A1 | 1/2020 | Yamane | |
| 2021/0231905 A1* | 7/2021 | Yamane | G02B 5/08 |
| 2023/0144201 A1* | 5/2023 | Yamane | G01N 23/04 378/62 |

FOREIGN PATENT DOCUMENTS

| | | |
|---|---|---|
| JP | 6478433 B2 | 3/2019 |
| JP | 2020-016543 A | 1/2020 |

* cited by examiner

*Primary Examiner* — Casey Bryant
(74) *Attorney, Agent, or Firm* — FOLEY & LARDNER LLP

(57) ABSTRACT

An imaging device includes an image processor configured to: i) determine that a detection intensity distribution indicating detection intensity with respect to position coordinates of a stage is a convolution of an image intensity distribution on an extension line of a linear pixel and a window function; (ii) calculate an image intensity distribution for each linear pixel by deconvolution from the detection intensity distribution; and (iii) generate an image of the subject by disposing the image intensity distribution calculated in all the linear pixels in an arrangement direction of the linear pixels.

12 Claims, 9 Drawing Sheets

IMAGING DEVICE AND IMAGE GENERATION METHOD

CROSS-REFERENCE TO RELATED APPLICATION(S)

This application is based upon and claims the benefit of priority from Japanese Patent Application No. 2022-149238, filed Sep. 20, 2022, the entire contents of which are incorporated herein by reference.

FIELD

Embodiments described herein relate generally to an imaging device and an image generation method.

BACKGROUND

In general, a transmission X-ray microscope can be configured for observing the structure of a subject with high resolution and nondestructively.

DETAILED DESCRIPTION

Embodiments provide an imaging device and an image generation method that can obtain a reconstructed image with high accuracy.

In general, according to one embodiment, there is provided an imaging device including a stage that configured to place a subject; a detector including a plurality of linear pixels having linear light receiving surfaces extending in a first direction arranged in a second direction orthogonal to the first direction with equal intervals; an image formation optical member configured to form an image based on imaging light passing through the subject on a detection surface of the detector; and an image processor configured to reconstruct the image of the subject based on detection intensity of the imaging light. The stage is scannable in a direction parallel to the first direction. The detector is configured to set a sampling interval equal to or less than half a time that a distance of a line length of the linear pixel is scanned in the stage, and output the detection intensity at each sampling interval. The image processor is configured to: i) determine that a detection intensity distribution indicating the detection intensity with respect to position coordinates of the stage is a convolution of an image intensity distribution on an extension line of the linear pixel and a window function; (ii) calculate the image intensity distribution for each linear pixel by deconvolution from the detection intensity distribution; and (iii) generate an image of the subject by disposing the image intensity distribution calculated in all the linear pixels in an arrangement direction of the linear pixels.

Hereinafter, embodiments will be described with reference to the accompanying drawings.

First Embodiment

The imaging device according to the embodiment is, for example, a transmission X-ray microscope. The transmission X-ray microscope is an image formation optical system using electromagnetic waves with short wavelengths, and has a high resolution of about several tens of nanometers. In addition, since X-rays have a high transmittance, it is possible to observe the surface structure and internal structure of a relatively thick subject such as a silicon wafer having a surface formed with a semiconductor device or the like on.

Figure 1:
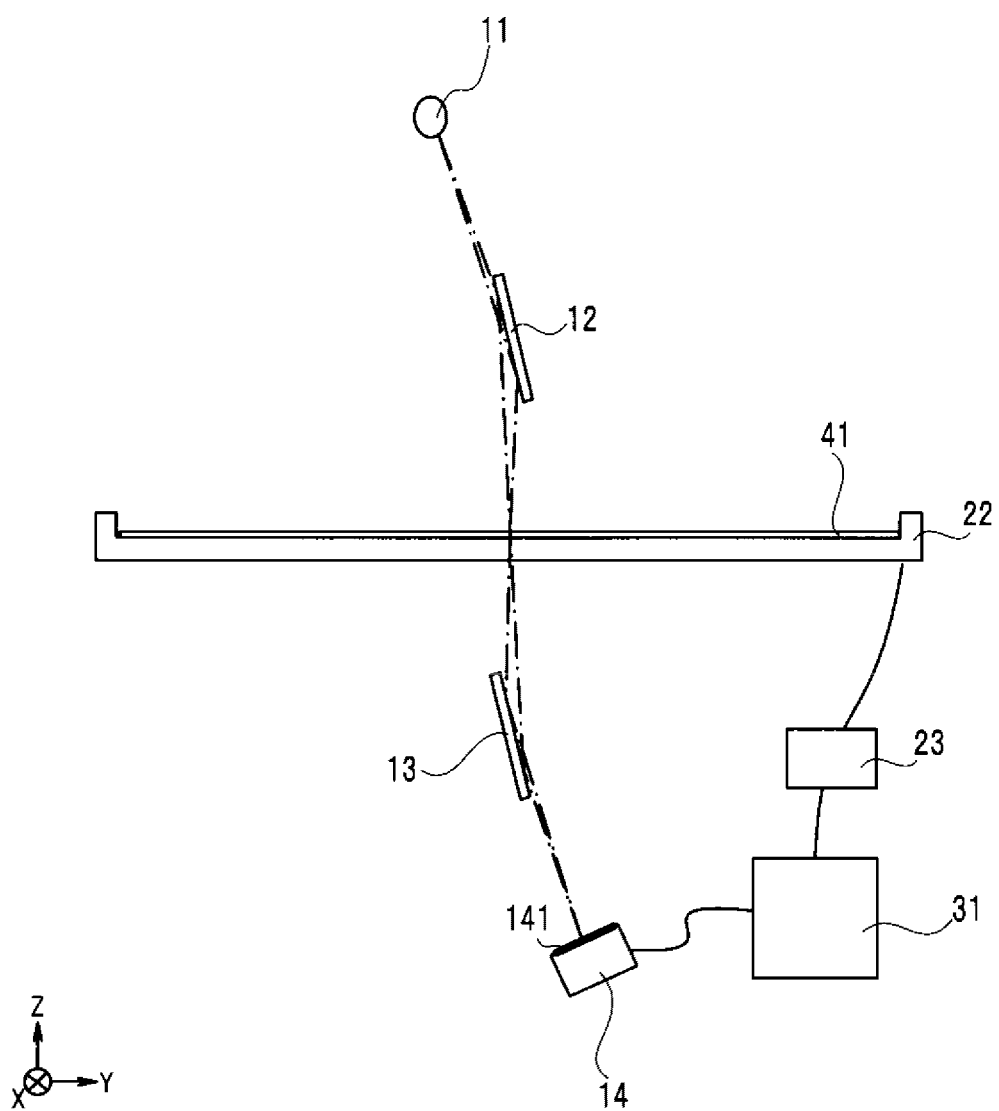
FIG. 1 is a schematic view showing an example of a configuration of an imaging device according to an embodiment.

FIG. 1 is a schematic view showing an example of the configuration of an imaging device according to the embodiment. The imaging device includes a light source 11, an illumination mirror 12, an objective mirror 13 and a one-dimensional detector 14. In addition, the imaging device also includes a stage 22, a stage drive section 23, and a control analysis section 31. The light source 11 is an X-ray source that irradiates a target made of molybdenum or the like with an electron beam to generate X-rays. The illumination mirror 12 is used to collect the X-rays emitted from the light source 11 toward the subject 41 placed on the stage 22. For example, a Montel mirror is used for the illumination mirror 12.

Figure 2:
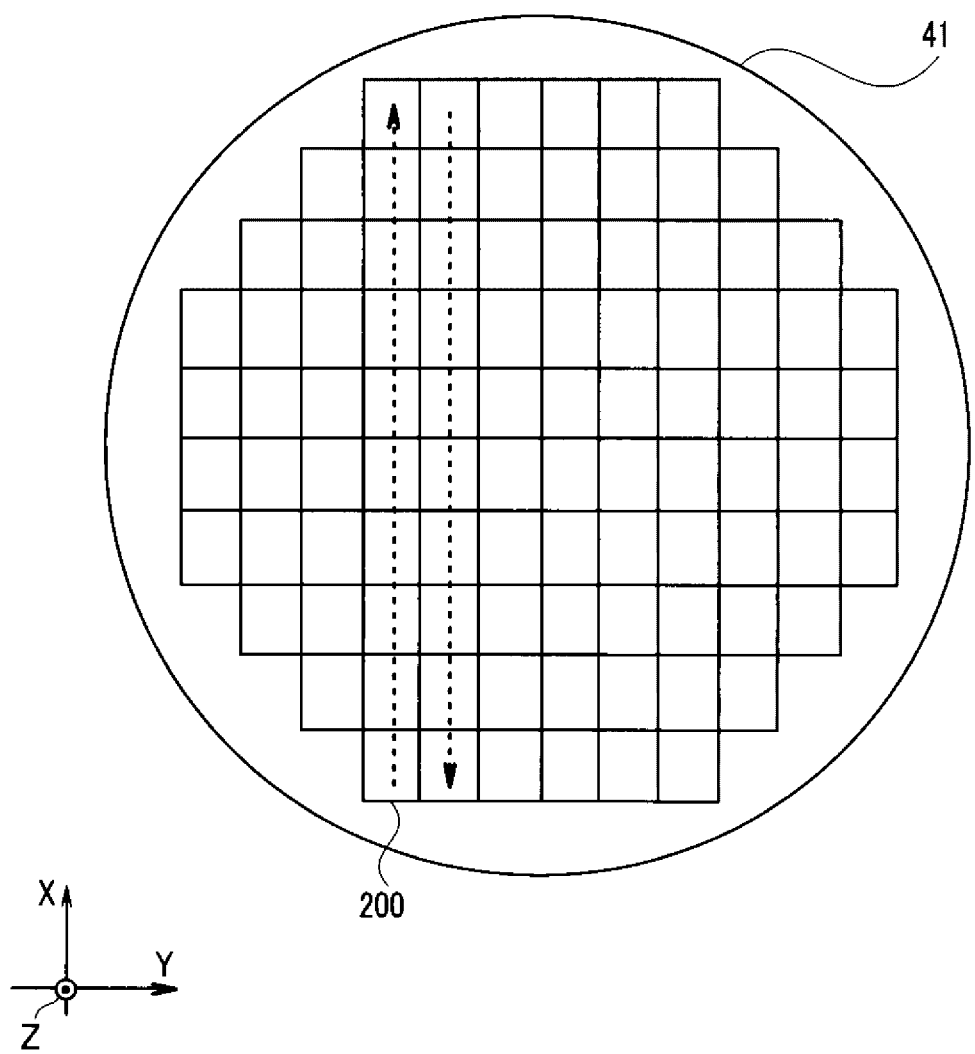
FIG. 2 is a schematic view showing an example of a subject.

The subject 41 is, for example, a silicon wafer on which semiconductor devices are formed. FIG. 2 is a schematic view showing an example of a subject. A silicon wafer 41 which is the subject has a plurality of memory chip corresponding areas 200 arranged in a matrix in X and Y directions. A plurality of memory chips is taken out by dicing (die cutting) the silicon wafer 41 at the boundaries of the memory chip corresponding areas 200. Various processes are repeated on the silicon wafer 41, such as depositing various films by CVD technology, implanting impurities into various films by ion implantation technology, and patterning the deposited films by lithography technology and etching technology. As a result, a non-volatile memory is formed in each of the plurality of memory chip corresponding areas 200.

In the present embodiment, the silicon wafer 41 is placed on the stage 22 and observation is performed while moving the stage 22 in the X direction. For example, in a state in which the silicon wafer 41 is placed on the stage 22, an irradiation position of the X ray on the silicon wafer 41 is moved by moving the stage 22 at a predetermined speed along the direction indicated by the dotted line with an arrow in FIG. 2.

Figure 3:
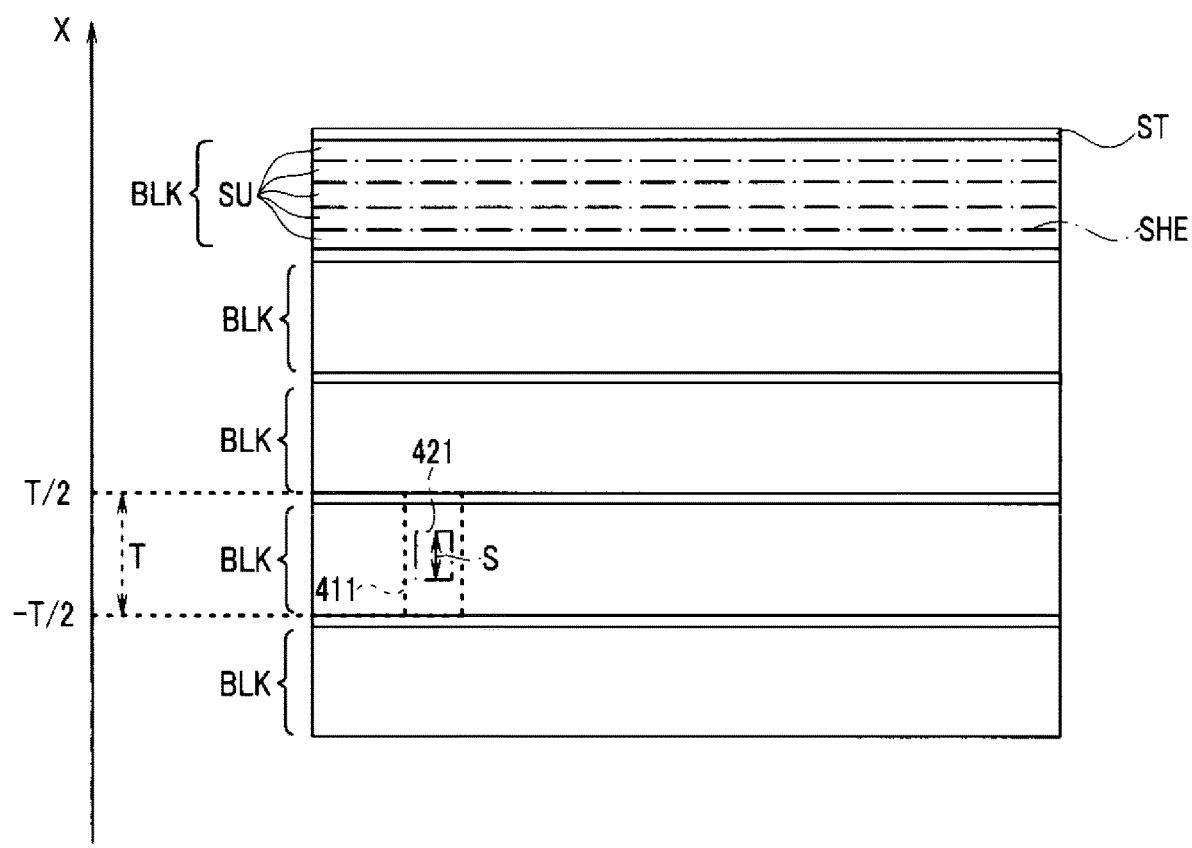
FIG. 3 is a plan view showing an example of a memory cell array formed in a memory chip corresponding area.

The memory chip corresponding area 200 includes for example, a memory cell array and peripheral circuits. FIG. 3 is a plan view showing an example of a memory cell array formed in the memory chip corresponding area 200. FIG. 3 shows an enlarged view of a partial area of the memory cell array. Each block BLK provided in the memory cell array is formed as a band-like area having a longitudinal direction (Y direction) orthogonal to the X direction and a predetermined width in the Y direction. A slit ST is formed between each block BLK. The slit ST is filled with an insulating material to electrically separate adjacent blocks BLK. Each block BLK includes a plurality of string units SU. The string unit SU is formed as a band-like area obtained by dividing the X-direction side of the block BLK. A slit SHE is formed between each string unit SU. In this way, the memory cell array has a periodic structure in units of blocks BLK. As shown in FIG. 3, for example, a block BLK including an observation area 421 is set as a scanning area 411 and observed.

Here, the observation area 421 is an area to be an observation target for the structure. In addition, the scanning area 411 is an area in which the subject 41 is irradiated with X-rays while being scanned in order to observe the structure of the observation area 421. More specifically, the range of the scanning area 411 in the X direction matches the range in which the center position of the X-ray irradiated to the subject 41 moves when the subject 41 is scanned and observed. The Y-direction range of the scanning area 411 matches the Y-direction range of the observation area 421 or the Y-direction detection range of the one-dimensional detector 14, whichever is larger. It is assumed that S is the length of the observation area 421 in the X direction, and T is the length of the scanning area 411 in the X direction.

Figure 4:
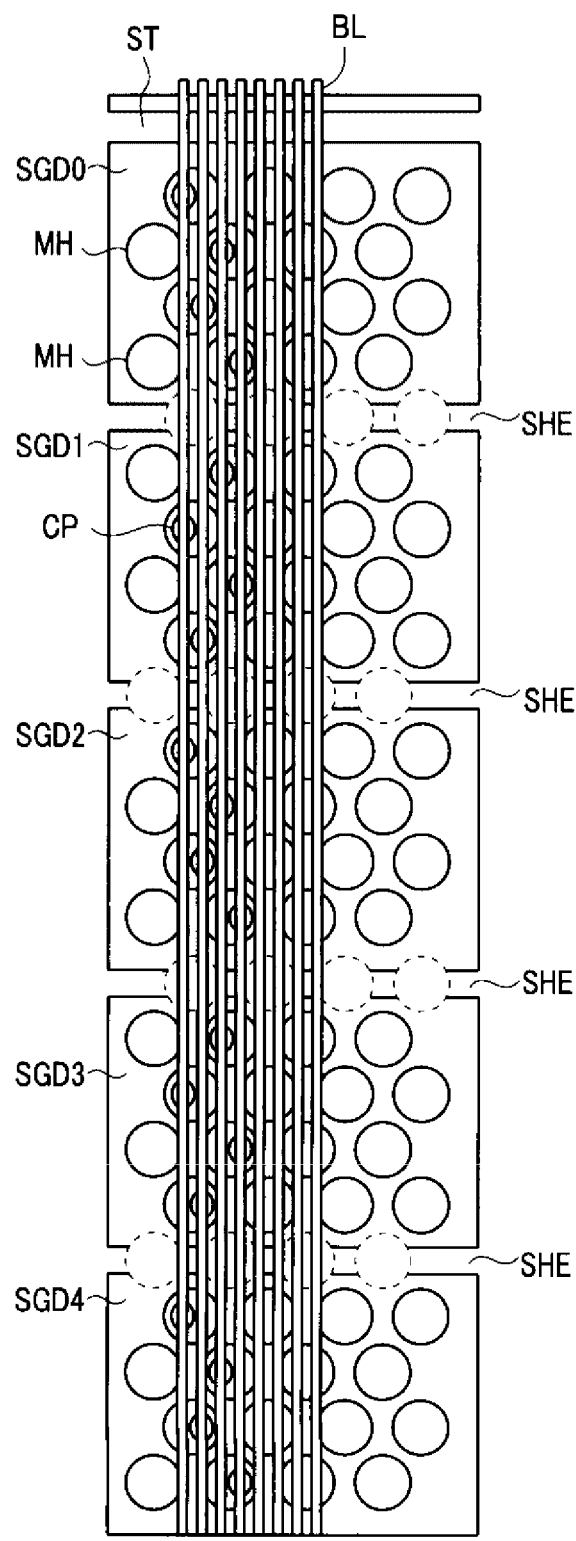
FIG. 4 is a plan view showing an example of a detailed structure of the memory cell array.

FIG. 4 is a plan view showing an example of the detailed structure of the memory cell array. FIG. 4 shows the structure of one block BLK, and shows an example in which five string units SU0 to SU4 each including five select gate lines SGD0 to SGD4 separated by the slit SHE are configured in one block BLK. The slit SHE is filled with an insulating material, and the select gate line SGD between adjacent string units SU is electrically separated. Each string unit SU includes a plurality of NAND strings. Each NAND string is formed in a columnar memory hole MH extending in the Z direction. A plurality of memory holes MH constituting a NAND string NS are disposed in one string unit SU. The number of NAND strings (memory holes) in one string unit is extremely large, and the memory holes MH are disposed in a staggered arrangement in order to reduce the chip size. Each memory hole MH in one string unit SU is connected to a bit line BL by a contact plug CP. Each bit line BL is connected to one memory hole MH for each string unit SU via the contact plug CP. In order to connect each bit line BL to one memory hole MH of each string, the position of the contact plug CP is shifted in the direction orthogonal to the extending direction of the bit line BL. The imaging device according to the embodiment is used, for example, to observe the surface structure of an area in which memory holes MH as shown in FIG. 4 are formed.

Figure 5:
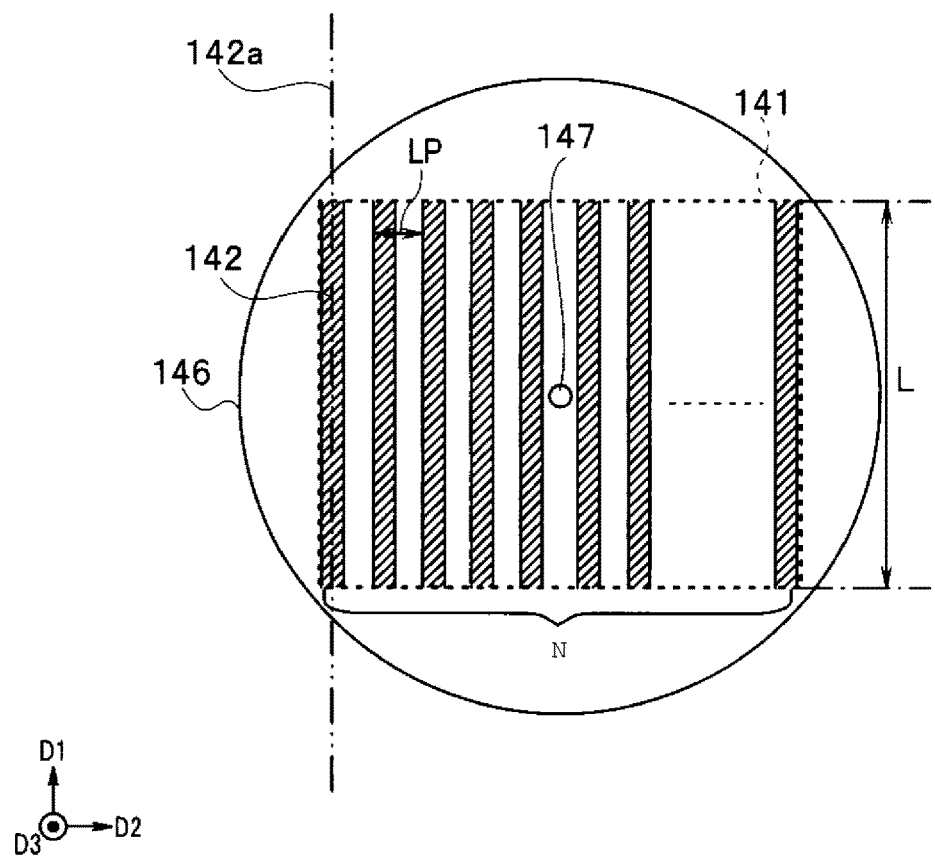
FIG. 5 is a schematic view showing a configuration of a one-dimensional detector.

Returning to FIG. 1, the detailed configuration of the imaging device according to the embodiment will be described. The objective mirror 13 as an image formation optical member collects the X-rays that have passed through the subject 41, and forms an image of the subject 41 on the detection surface 141 of the one-dimensional detector 14. FIG. 5 is a schematic view showing a configuration of the one-dimensional detector. As shown in FIG. 5, the one-dimensional detector 14 is constructed by disposing N superconducting strips 142 functioning as linear pixels extending in a D1 direction at equal intervals in a D2 direction in the detection surface 141. The image of the subject 41 disposed parallel to an XY plane is formed on a D1-D2 plane of the detection surface 141. In addition, the optical axis of the X-ray is incident on the subject 41 along the Z direction, and is incident on the detection surface 141 of the one-dimensional detector 14 along a D3 direction. That is, the D1 direction of the detection surface 141 corresponds to the X direction of the subject 41, the D2 direction of the detection surface 141 corresponds to the Y direction of the subject 41, and the D3 direction of the detection surface 141 corresponds to the Z direction of the subject 41. The D1 direction, the D2 direction, and the D3 direction are orthogonal to each other. For the one-dimensional detector 14, for example, a superconducting strip detector in which a plurality of superconducting strips (superconducting single photon detectors) are disposed is used. A width (a length in the D2 direction in FIG. 5) and a thickness (a length in the D3 direction in FIG. 5) of the superconducting strip 142 are determined so that the cross-sectional area of the superconducting strip 142 which is a linear pixel is small enough to cause division of the superconducting area. In the following description, it is assumed that a pixel pitch LP is the sum of the width of one superconducting strip 142 and the interval between adjacent superconducting strips 142. In addition, it is assumed that L is the length of the superconducting strip 142. The detection surface 141 of the one-dimensional detector 14 is set to have as large an area as possible within an area 146 irradiated with the X-rays emitted from the light source 11 so that X-rays can be detected over as wide a range as possible.

Figure 6:
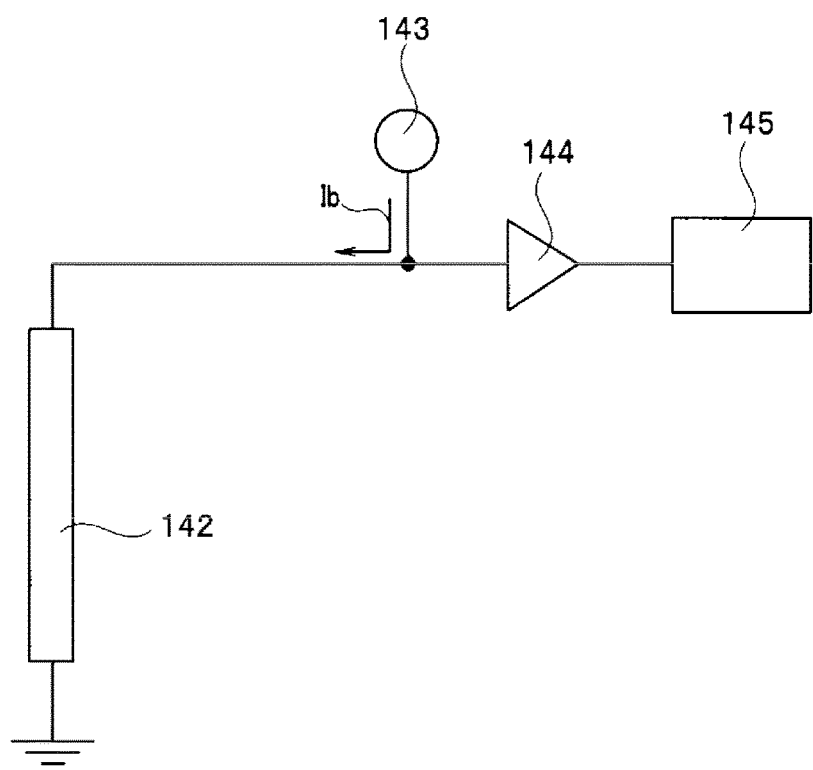
FIG. 6 is a principle circuit configuration view of the one-dimensional detector.

FIG. 6 is a principle circuit configuration diagram of the one-dimensional detector. FIG. 6 shows one of a plurality of the disposed superconducting strips 142, and a current source 143, an amplifier 144, and a measuring device 145 corresponding to the one superconducting strip 142. As shown in FIG. 6, each superconducting strip 142 has one end which is grounded. The superconducting strip 142 has another end which is connected to the current source 143 and the amplifier 144. The current source 143 supplies bias current Ib to the superconducting strip 142. The amplifier 144 amplifies the electrical signal generated by the superconducting strip 142 and transmits an output signal (electrical signal) to the measuring device 145. The measuring device 145 counts pulsed output signals (electrical signals) transmitted from the amplifier 144 when X-ray photons are detected by the superconducting strip 142. The current source 143, the amplifier 144, and the measuring device 145 may also be provided outside the one-dimensional detector 14. For example, a configuration in which the current source 143, the amplifier 144, and the measuring device 145 are provided within the control analysis section 31 is also possible.

Figure 7:
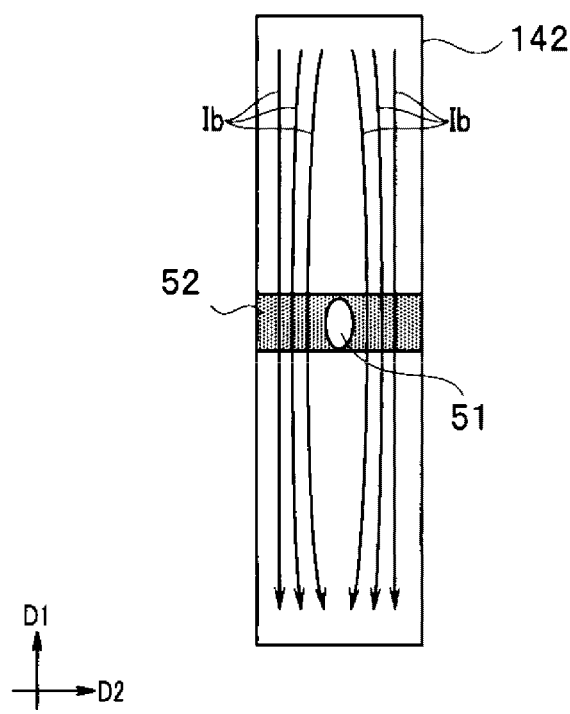
FIG. 7 is a view showing a detection principle of X-ray photons in a superconducting strip.

FIG. 7 is a view showing a detection principle of the X-ray photons in the superconducting strip. First, the superconducting strip 142 is cooled to be equal to or lower than a critical temperature by a refrigerator (not shown) to be in a superconducting state. Then, the current source 143 supplies the bias current Ib that is slightly below the critical current for maintaining the superconducting state of the superconducting strip 142. In this state, X-ray photons are incident on the superconducting strip 142.

At this time, the width and thickness of the superconducting strip 142 are about 200 nm, and the cross-sectional area of the superconducting strip 142 is small.

Therefore, when the X-ray photons are absorbed by the superconducting strip 142, as shown in FIG. 7, an area (hotspot area) 51 that transfers to normal conduction called a hotspot is formed in the superconducting area of the superconducting strip 142. Since the electrical resistance of the hotspot area 51 increases, as shown in FIG. 7, the bias current Ib bypasses the hotspot area 51 and flows in a detour area 52, which is another area.

Then, when a current which is equal to or higher than the critical current flows through the detour area 52, the detour area 52 transitions to normal conduction, the electrical resistance increases, and finally the superconducting area of the superconducting strip 142 is divided. That is, a state (divided state) occurs in which the superconducting area of the superconducting strip 142 described above is divided. After that, the hotspot area 51 and the detour area 52 that have transferred to normal conduction rapidly disappear by cooling, so that the pulsed electrical signal is generated by a temporary electrical resistance generated by the division of the superconducting area of the superconducting strip 142. By amplifying the pulsed electrical signal with an amplifier 144 and counting the pulsed electrical signal with the measuring device 145, the number of X-ray photons can be detected. The number of X-ray photons for each superconducting strip 142 counted by the measuring device 145, that is, the detection result of the one-dimensional detector 14 is output to the control analysis section 31.

The control analysis section 31 as an image processing unit (or image processor) analyzes a signal (detection result) output from the one-dimensional detector 14, and reconstructs the image (two-dimensional image) of the subject 41. A specific reconstruction method for a two-dimensional image will be described in detail later. For example, a personal computer having a central processing unit (CPU) and a memory (RAM) may be used as the control analysis section 31. An operation of reconstructing the image of the subject 41 is performed by software, for example, by storing the operation in a memory in advance as a program and executing the operation in the CPU. In addition, the operation of reconstructing the image of the subject 41 may be performed by one or more processors configured as hardware. For example, it may be a processor configured as an electronic circuit, or a processor configured with an integrated circuit such as a Field Programmable Gate Array (FPGA). In addition, the control analysis section 31 outputs a control signal to the stage drive section 23 that moves the stage 22 in the X direction or the Y direction, and instructs a movement timing, a movement direction, a movement speed v, and the like.

Figure 8A:
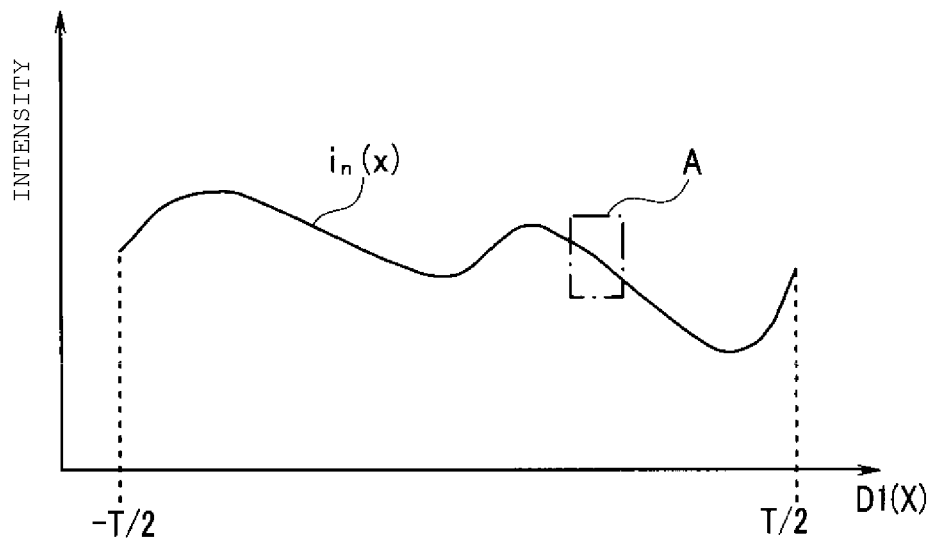
FIG. 8A is a view showing an example of detection intensity distribution of a pixel n.
Figure 8B:
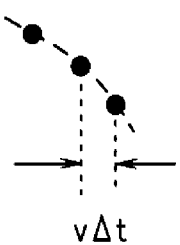
FIG. 8B is an enlarged view of an area A in FIG. 8A.
Figure 9:
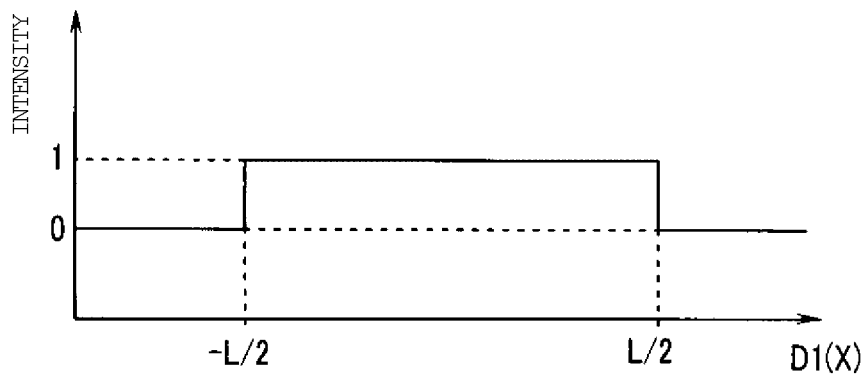
FIG. 9 is a view showing an example of a window function.
Figure 10:
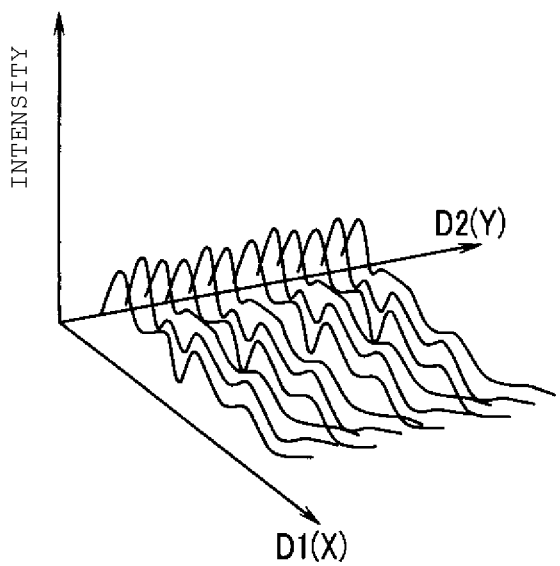
FIG. 10 is a view showing an example of a reconstructed two-dimensional image of a subject.

Next, a specific method of reconstructing the two-dimensional image in the control analysis section 31 will be described with reference to FIGS. 8A to 10. FIG. 8A is a diagram showing an example of detection intensity distribution of pixel n. In addition, that is, an example of the detection intensity distribution for one pixel out of the N superconducting strips (pixels) 142 disposed on the detection surface 141 is shown. FIG. 8B is an enlarged view of an area A in FIG. 8A. FIG. 9 is a view showing an example of a window function. FIG. 10 is a view showing an example of the reconstructed two-dimensional image of the subject. In the following description, x is the position on the D1(X) coordinate corresponding to the center 147 of the detection surface 141 on the subject 41. In other words, x is a position on the X coordinate at which the X-ray incident on the center 147 of the detection surface 141 passes through the subject 41. It is assumed that the scanning range of x when observing the subject 41 while scanning the stage 22 in the X direction is $-T/2 \leq x < T/2$ (see FIG. 3).

When a superconducting nanostrip detector is used as the one-dimensional detector 14 and one X-ray photon is detected in a certain pixel, one pulse signal is output. By setting the cumulative number of photons detected during a certain sampling interval $\Delta t$ as intensity and plotting the intensity against the X coordinate, a detection intensity distribution $i_n(x)$ as shown in FIG. 8A is obtained. The detection intensity distribution $i_n(x)$ ($1 \leq n \leq N$) is obtained for each of the N superconducting strips (pixels) 142 disposed on the detection surface 141. As shown in FIG. 8B, $i_n(x)$ is discrete data with a grid interval of $v\Delta t$ for x ($x=-T/2$, $-T/2+v\Delta t$, $-T/2+2v\lambda t$, ..., $T/2-v\Delta t$) where v is the scanning speed of the stage 22.

Next, by deconvolution, the image intensity distribution $a'_n(x)$ on the extension line of the linear pixel n is obtained. For example, the image intensity distribution $a'_n(x)$ on the straight line 142a indicated by a two-dot chain line in FIG. 5 is obtained. The detection intensity $i_n(x0)$ of the pixel n at a position (x0) on a certain X coordinate is represented by the following Equation (1) using the image intensity distribution $a_n(x)$ of the subject 41 on the extension line of the linear pixel n and a window function w(x), where the window function w(x) becomes 1 in the interval $-L/2 \leq x \leq L/2$ and 0 in other intervals as shown in FIG. 9.

$$i_n(x_0) = \int a_n(x) \times w_n(x - x_0) dx \tag{1}$$

As shown in Equation (1), $i_n(x)$ is the convolution of $a_n(x)$ and $w_n(x)$. When it is assumed that a spatial frequency in the X direction is u and the Fourier transforms of $i_n(x)$, $a_n(x)$, and $w_n(x)$ are $I_n(u)$, $A_n(u)$, and $W_n(u)$, $I_n(u)$ is represented by the following Equation (2) according to the transformation convolution theorem.

$$I_n(u) = A_n(u) W_n(u) \tag{2}$$

By inversing Fourier transform of $A_n(u)$ obtained by $I_n(u)/W_n(u)$, the image intensity distribution $a'_n(x)$ on the extension line of pixel n can be obtained.

Finally, the two-dimensional image as shown in FIG. 10 is reconstructed by disposing the image intensity distribution $a'_n(x)$ of each pixel n ($1 \leq n \leq N$) in the Y direction.

Figure 11:
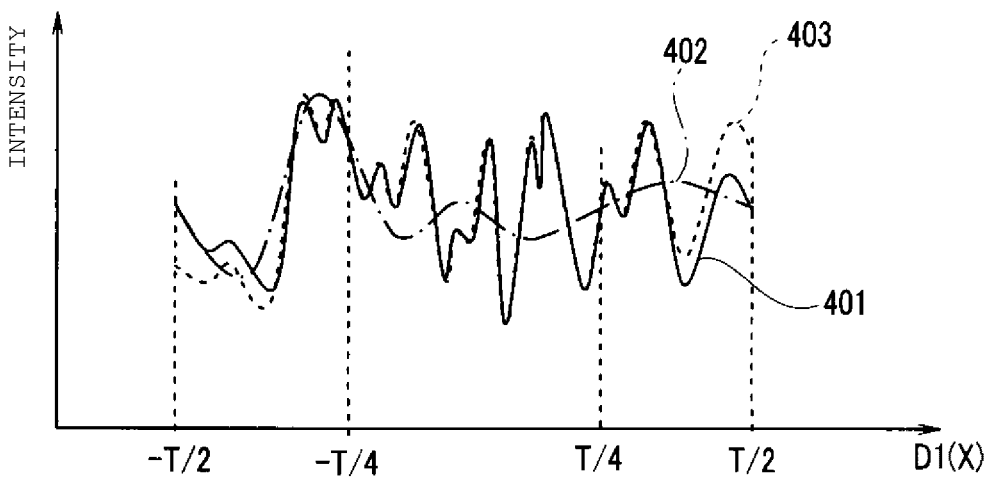
FIG. 11 is a diagram showing examples of intensity distribution and actual intensity distribution before and after deconvolution.

FIG. 11 is a diagram showing examples of the intensity distribution and actual intensity distribution before and after deconvolution. In FIG. 11, a profile 402 indicated by a one-dot chain line indicates the detection intensity distribution $i_n(x)$ before deconvolution, that is, output from the one-dimensional detector 14. In addition, a profile 401 indicated by a solid line indicates the image intensity distribution $a'_n(x)$ after deconvolution. Furthermore, a profile 403 indicated by a dotted line indicates the image intensity distribution $a_n(x)$ of the subject 41, which is the actual image intensity distribution. As shown in FIG. 11, the deviation of the image intensity distribution $a'_n(x)$ with respect to the image intensity distribution $a_n(x)$ is smaller than the deviation of the detection intensity distribution $i_n(x)$ with respect to the image intensity distribution $a_n(x)$. That is, by performing deconvolution as described above, a reconstructed image can be obtained with high accuracy.

As a method of obtaining a reconstructed image by detecting the intensity of X-rays passing through the subject 41 with a one-dimensional detector having linear pixels, a method of reconstructing a two-dimensional image by obtaining one-dimensional image intensity distribution while the rotating the subject 41 is given as a comparative example. In the comparative example, when detecting the intensity of passing X-rays, it is necessary to rotate the subject 41 with high accuracy so that a central axis does not shift. When the central axis shifts during rotation, X-ray photons are detected at pixels that are different from the pixels that should be originally detected. Since the image intensity distribution is integrated based on the pixel position, correct integration cannot be performed when a rotation axis is deviated, and the accuracy of the reconstructed image is lowered. On the other hand, the imaging device according to the embodiment obtains the intensity distribution by scanning the subject 41 along the longitudinal direction of the linear pixels without rotating the subject 41, and obtains the reconstructed image by deconvolution. Therefore, the reconstructed image can be obtained with high accuracy than in the comparative example.

Next, a minimum size in the X direction that can be recognized as the sampling interval $\Delta t$ will be described. The minimum detection unit (resolution) is assumed to be U. With respect to the length L of the superconducting strip (pixel) 142 in the D1(X) direction, when L≤U and $\Delta t$ is L/v, the detection areas obtained at each sampling do not overlap, the detection intensity distribution becomes the image intensity distribution of resolution L (shorter than U) as it is without performing deconvolution, so that an observation target having a size of U can be recognized. Therefore, the imaging device according to the present embodiment can obtain a reconstructed image with high accuracy when L>U, that is, when the length of the observation target in the X direction is shorter than the length of the superconducting strip (pixel) 142. According to the sampling theorem, the sampling interval $\Delta t$ should be equal to or less than U/(2v). Therefore, $\Delta t$ is less than L/(2v).

The grid interval v$\Delta t$ of the image intensity distribution $a'_n(x)$ calculated by deconvolution corresponds to a resolution Px in the X direction. Since $\Delta t$ is less than L/(2v), Px is less than L/2. On the other hand, the resolution Py in the Y direction corresponds to the pitch LP of the superconducting strips (pixels) 142 arranged in the D2(Y) direction. Therefore, according to the present technique, it is possible to obtain a two-dimensional image having a resolution which is less than L/2 in the X direction and a resolution which corresponds to the pitch LP of the superconducting strips (pixels) 142 in the Y direction.

In addition, the minimum size in the X direction of the observation target that can be recognized is 2v$\Delta t$. The minimum size which can be recognized in the Y direction is Py is equal to the resolution in the Y direction, and normally, the minimum size which can be recognized is the same in the X and Y directions, so that $\Delta t$ is Py/(2v) in this case.

In the embodiment, it is assumed that the optical magnification when the X-rays enter the subject 41 and the optical magnification when the X-rays enter the detection surface 141 are equal. When the magnifications are different from each other, conversion may be performed on the numerical values by multiplying an appropriate coefficient.

Figure 12:
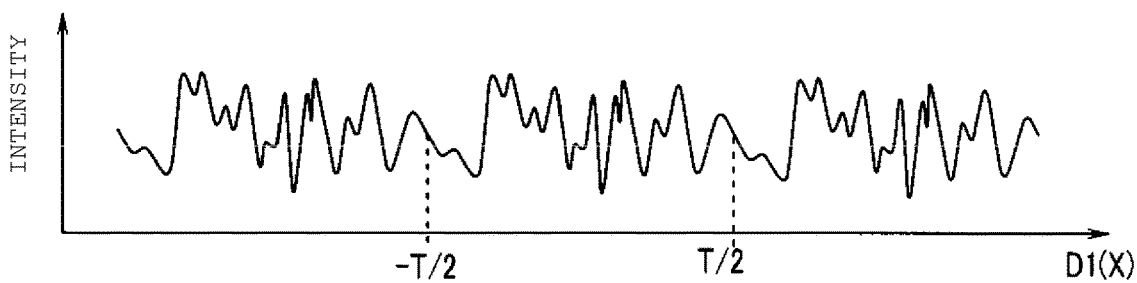
FIG. 12 is a diagram schematically showing the intensity distribution inside and outside a scanning area after deconvolution.

Next, the setting of the length T of the scanning area 411 in the X direction on the stage will be described. As shown in FIG. 8A, the range in which the detection intensity distribution $i_n(x)$ is obtained is $-T/2 \le x < T/2$. FIG. 12 is a diagram schematically showing the intensity distribution inside and outside the scanning area after deconvolution. When obtaining the image intensity distribution a'n(x) in the range $-T/2 \le x < T/2$ by deconvolution, as shown in FIG. 12, it is considered that a'n(x) appears repeatedly in the interval x<−T/2 and x≥T/2, so that $a'_n(x)=a'_n(x+T)$. Therefore, $a'_n(-T/2)=a'_n(T/2)$, and the image intensity distribution $a'_n(x)$ obtained when x is near −T/2 and T/2 does not necessarily match the actual image intensity distribution $a_n(x)$ (see FIG. 11). Therefore, it is necessary to set the length T of the scanning area 411 in the X-direction so that the range of the observation area 421 in the X-direction is included in −T/4<x<T/4, which is considered as the error with the actual image intensity distribution is small. That is, it is preferable to set the length T of the scanning area 411 in the X direction is equal to or larger than twice the length S of the observation area 421 in the X direction.

However, when the observation area 421 is set in an area having a periodic structure such as a block BLK of a semiconductor memory cell as shown in FIG. 3 and the scanning area 411 is set such that the periodic structure continues at x=−T/2 or T/2, the error with the actual image intensity distribution is small even though $a'_n(-T/2)=a'_n(T/2)$, so that it is possible to widen a range in which the error is small in the obtained two-dimensional image. That is, the length T of the scanning area 411 in the X direction may be equal to or greater than the length S of the observation area 421 in the X direction, and may not be set to twice or more the length S.

In this way, when observing the periodic structure, by matching the boundary of the scanning area 411 with the boundary of the periodic structure, the accuracy of the reconstructed two-dimensional image can be further improved. The scanning area 411 may be set so as to include the periodic structure of two or more periods. For example, when the example shown in FIG. 3 is provided, the scanning area 411 may be set to include two blocks BLK.

Next, the number of times of sampling will be explained. The number of times of sampling is represented by T/(v$\Delta t$), and the number of discrete data of $i_n(x)$, $I_n(U)$, $A_n(U)$, and $a'_n(x)$ is the same as the number of times of sampling. Division into spatial frequency components, the number of which is the same as the number of times of sampling. When the number of samplings is small, actually existing spatial frequency is lost by $i_n(x)$, and there is a possibility that the difference from $a_n(x)$ is increased by $a'_n(x)$. For this reason, it is desirable that the number of times of sampling is as large as possible. Specifically, it is desirable that T is equal to or greater than 100 times the distance (v$\Delta t$) scanned at the sampling interval. On the other hand, when the number of times of sampling is too large, the intensity detected by one sampling is small, and the proportion of noise components (for example, shot noise) in the detected intensity increases. Therefore, it is necessary that the number of times of sampling is equal to or less than the number of times of sampling that noise in the detection intensity can be permitted.

Figure 13:
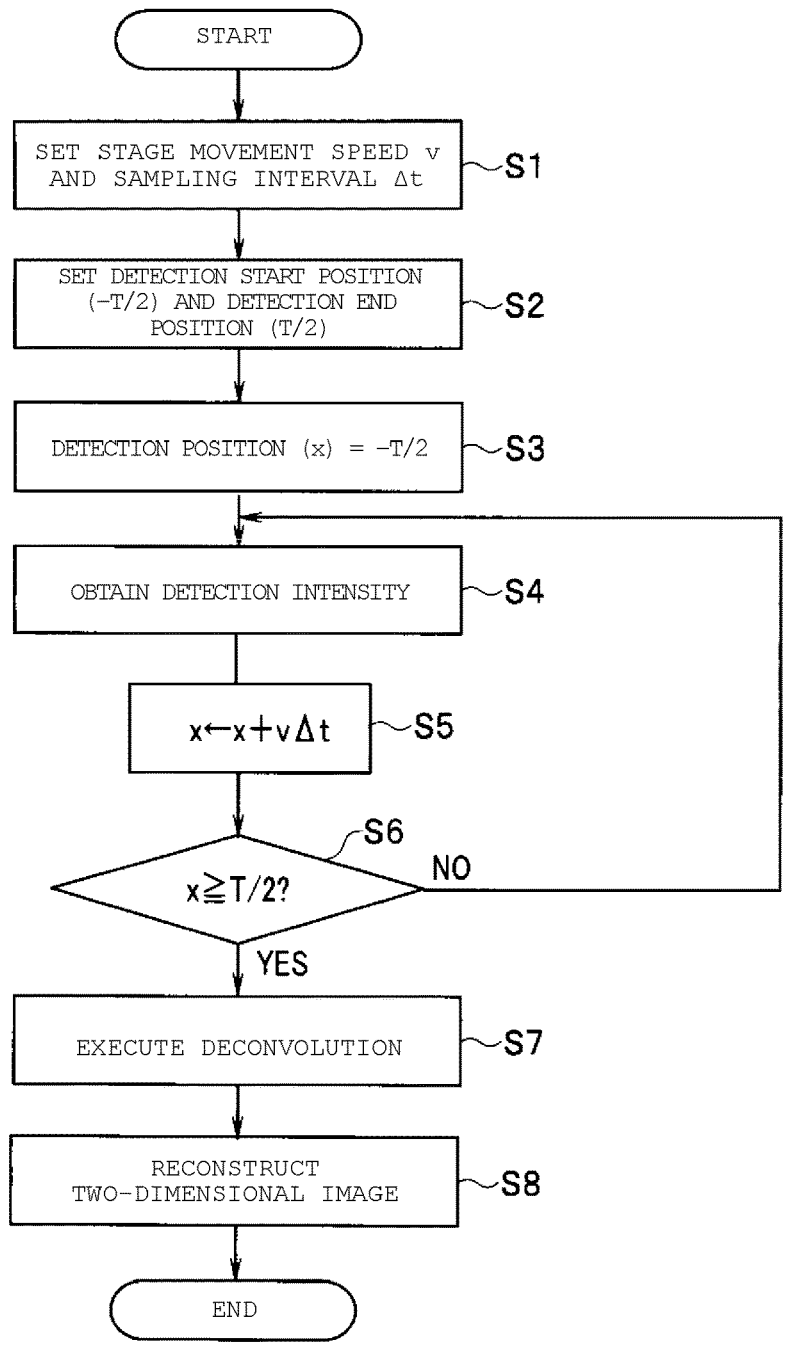
FIG. 13 is a flowchart showing an example of an image generation method according to a first embodiment.

Next, an image generation method using the imaging device according to the embodiment will be described. FIG. 13 is a flowchart showing an example of the image generation method of the first embodiment. Observation (image generation) is started after the subject 41 is placed on the stage 22.

First, the movement speed v of the stage 22 and the sampling interval $\Delta t$ are set (S1). Then, a detection start position (−T/2) and a detection end position (T/2) are set (S2). Specifically, on the subject 41, for the X-coordinate position (=x) at which the X-rays incident on the center 147 of the detection surface 141 on the subject 41 pass through, a position at a time point of the start of detection and a position at a time of the end of detection are set. S2 may also be described as the setting of the scanning area 411. The setting of the scanning area 411 in S2 is performed in consideration of the length S of the observation area 421 in the X direction, the structure of the subject 41 (periodic structure or not), and the like, as described above.

Subsequently, the position of the stage 22 is adjusted so that x matches the detection start position (−2/T) set in S2 (S3), and the subject 41 is irradiated with X-rays from the light source 11, thereby obtaining the detection intensity output from the one-dimensional detector 14 (S4).

When x is moved from the current coordinates to the positive side in the X direction by vΔt which is the grid interval (S5) and the position of x after movement does not exceed the detection end position (T/2) set in S2 (S6, NO), the process returns to S4 and the detection intensity at the position after the movement is obtained. On the other hand, when the position of x after movement exceeds the detection end position (T/2) set in S2 (S6, YES), obtaining of the intensity in the set scanning area 411 is completed, and the process proceeds to S7.

In S7, deconvolution is performed using the detection intensity distribution $i_n(x)$ obtained in S4 to obtain an image intensity distribution $a'_n(x)$. Finally, the image intensity distribution $a'_n(x)$ of each pixel n (1≤n≤N) is disposed in the Y direction to reconstruct the two-dimensional image (S8), and a series of procedures related to the image generating method according to the first embodiment ends.

As described above, according to the imaging device according to the embodiment, it is possible to calculate an image intensity distribution having a resolution which is equal to or less than L from the detection intensity distribution by the superconducting strip 142 which is a linear pixel having a length L. Therefore, by scanning the one-dimensional detector 14, a highly accurate two-dimensional image can be obtained in which the resolution in the X direction is equal to or less than the pixel line length L and the resolution in the Y direction is equal to the line array pitch LP. In addition, according to the imaging device according to the embodiment, while scanning the subject 41 along the longitudinal direction of the superconducting strip 142 disposed in the one-dimensional detector 14, the intensity distribution of passing X-rays is obtained and the reconstructed image is obtained by deconvolution. Since it is not necessary to rotate the subject 41 when obtaining the intensity distribution, positional deviation (deviation of the rotation axis) does not occur when scanning the subject 41, so that the reconstructed image can be generated with high accuracy. In addition, since it is not necessary to rotate and scan the subject 41, a mechanism for driving the stage 22 can be simplified, and the size and cost of the device can be reduced.

Although the above embodiment assumes a transmission X-ray microscope, any device that obtains an image of the subject 41 may be used.

Second Embodiment

Next, a second embodiment will be described. The image generation method according to the present embodiment is different from the image generation method of the above-described first embodiment in the detection intensity distribution $i_n(x)$ used during deconvolution. The configurations of the imaging device and the image forming device are the same as in the above-described first embodiment, so that description thereof will not be repeated, and only the differences from the first embodiment will be described below.

In the above-described first embodiment, the range in which the detection intensity distribution $i_n(x)$ is obtained is −T/2≤x<T/2. When obtaining the image intensity distribution $a'_n(x)$ in the range of −T/2≤x<T/2, deconvolution is performed by assuming that $a'_n(x)$ appears repeatedly the intervals x<−T/2 and x≥T/2. On the other hand, in the present embodiment, with the design data of the semiconductor device corresponding to the subject 41 and a simulation using the optical constants of the materials constituting the device, the image intensity distribution is obtained in advance for the intervals x<−T/2 and x≥T/2. An image generation method according to the second embodiment will be described below with reference to FIG. 14.

Figure 14:
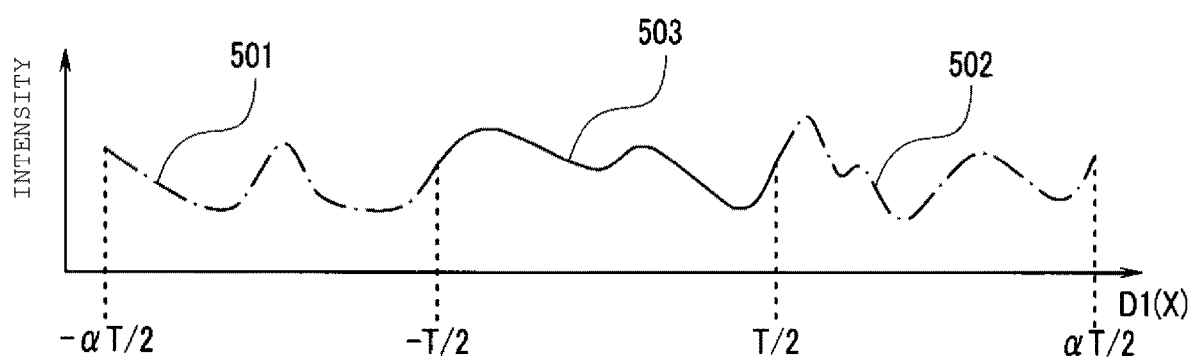
FIG. 14 is a diagram schematically showing intensity distribution inside and outside a scanning area according to a second embodiment.

FIG. 14 is a diagram schematically showing the intensity distribution inside and outside the scanning area in the second embodiment. Using the image intensity distribution obtained by simulation and Equation (1), the simulated detection intensity distribution 501 in −αT/2≤x<−T/2 and the simulated detection intensity distribution 502 in the range of T/2≤x<αT/2 are obtained. Here, α is set to a value more than 1. In the range of −T/2≤x<T/2, the detection intensity distribution 503 detected by the one-dimensional detector 14 is obtained. By synthesizing the simulated detection intensity distributions 501 and 502 and the detection intensity distribution 503 actually obtained by the one-dimensional detector 14, the intensity distribution $i_n(x)$ in the range of −αT/2≤x<αT/2 is obtained. By using the intensity distribution $i_n(x)$ generated in this way and performing deconvolution in the same manner as in the first embodiment, the image intensity distribution $a'_n(x)$ is obtained. A two-dimensional image is reconstructed by disposing the image intensity distribution $a'_n(x)$ of each pixel n (1≤n≤N) in the Y direction.

As described above, according to the image generation method according to the embodiment, in the sections of x<−T/2 and x≥T/2, deconvolution is performed using the detection intensity distribution generated by the simulation based on the structure and material of the subject 41. Therefore, the error between the actual image intensity distribution $a_n(x)$ and the image intensity distribution $a_n(x)$ when x is near −T/2 and T/2 can be reduced. Therefore, a reconstruction image can be obtained with higher accuracy.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An imaging device comprising:
    a stage configured to place a subject;
    a detector including a plurality of linear pixels having linear light receiving surfaces extending in a first direction arranged in a second direction orthogonal to the first direction with equal intervals;
    an image formation optical member configured to form an image based on imaging light passing through the subject on a detection surface of the detector; and
    an image processor configured to reconstruct the image of the subject based on detection intensity of the imaging light,
    wherein the stage is scannable in a direction parallel to the first direction, the detector is configured to set a sampling interval equal to or less than half a time to scan a distance of a line length of the linear pixel by the stage, and outputs the detection intensity at each sampling interval, and the image processor is configured to: (i) determine that a detection intensity distribution indicating the detection intensity with respect to position coordinates of the stage is a convolution of an image intensity distribution on an extension line of the linear pixel and a window function; (ii) calculate the image intensity distribution for each linear pixel by deconvolution from the detection intensity distribution; and (iii) generate an image of the subject by disposing the image intensity distribution calculated in all the linear pixels in an arrangement direction of the linear pixels.

2. The imaging device according to claim 1,
wherein the sampling interval is a value obtained by dividing a pixel pitch of the linear pixels arranged in the second direction by twice a scanning speed of the stage.

3. The imaging device according to claim 1,
wherein a distance in which the stage is scanned is equal to or greater than 100 times a value obtained by multiplying the sampling interval by a speed at which the stage is scanned.

4. The imaging device according to claim 1,
wherein the subject has a periodic structure at least in part, and a scanning start position and a scanning end position are set such that the periodic structure is continuous at the scanning start position and the scanning end position of the stage.

5. The imaging device according to claim 4,
wherein the subject is a semiconductor storage device that is formed with a memory cell array.

6. The imaging device according to claim 1,
wherein the image processor includes a simulator configured to: (i) simulate the detection intensity distribution outside a scanning range of the stage in the first direction; (ii) generate a synthesizing intensity distribution obtained by synthesizing a first simulated detection intensity distribution that is the detection intensity distribution on a negative side in the first direction rather than the scanning range generated by the simulator, a second simulated detection intensity distribution that is the detection intensity distribution on a positive side in the first direction rather than the scanning range generated by the simulator, and the detection intensity distribution detected by the one-dimensional detector; and (iii) calculate the image intensity distribution using the image intensity distribution.

7. The imaging device according to claim 1,
wherein the window function presents a first state in a range of position coordinates of the stage corresponding to the length of the linear pixel and presents a second state in other ranges.

8. An image generation method, comprising:
irradiating a subject placed on a stage with imaging light;
outputting detection intensity of imaging light passing through the subject at each sampling interval to be equal to or less than half a time that a distance of a line length of the linear pixel is scanned in the stage by a detector, wherein the detector includes a plurality of linear pixels having linear light receiving surfaces extending in a first direction arranged in a second direction orthogonal to the first direction at equal intervals while scanning the subject at a predetermined speed in the first direction;
determining that a detection intensity distribution indicating the detection intensity with respect to position coordinates of the stage is a convolution of an image intensity distribution on an extension line of the linear pixel and a window function;
calculating the image intensity distribution for each linear pixel by deconvolution from the detection intensity distribution; and
generating an image of the subject by disposing the image intensity distribution calculated in all the linear pixels in an arrangement direction of the linear pixels.

9. The image generation method according to claim 8,
wherein the window function presents a first state in a range of position coordinates of the stage corresponding to the length of the linear pixel and presents a second state in other ranges.

10. The image generation method according to claim 8, further comprising:
dividing a pixel pitch of the linear pixels arranged in the second direction by twice a scanning speed of the stage as the sampling interval.

11. The image generation method according to claim 8,
wherein the subject has a periodic structure at least in part, and a scanning start position and a scanning end position are set such that the periodic structure is continuous at the scanning start position and the scanning end position of the stage.

12. The image generation method according to claim 8,
wherein the subject is a semiconductor storage device that is formed with a memory cell array.

* * * * *